US012602945B2

(12) United States Patent
Wilhite et al.

(10) Patent No.: US 12,602,945 B2
(45) Date of Patent: Apr. 14, 2026

(54) REAL-TIME DOCUMENT FORGERY DETECTION

(71) Applicant: Bank of America Corporation, Charlotte, NC (US)

(72) Inventors: Oralie D. Wilhite, Chesapeake, VA (US); Amit Mehndiratta, New Delhi (IN); Vinod Maghnani, Gurugram Haryana (IN); Jeffrey N. Healy, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 369 days.

(21) Appl. No.: 18/401,637

(22) Filed: Jan. 1, 2024

(65) Prior Publication Data

US 2025/0218204 A1 Jul. 3, 2025

(51) Int. Cl.
| | |
|---|---|
| *G06V 20/00* | (2022.01) |
| *G06Q 30/018* | (2023.01) |
| *G06V 30/162* | (2022.01) |
| *G06V 30/19* | (2022.01) |
| *G06V 30/40* | (2022.01) |

(52) U.S. Cl.
CPC ......... G06V 20/95 (2022.01); G06Q 30/0185 (2013.01); G06V 30/162 (2022.01); G06V 30/19093 (2022.01); G06V 30/19147 (2022.01); G06V 30/40 (2022.01)

(58) Field of Classification Search
None
See application file for complete search history.

(56) References Cited

U.S. PATENT DOCUMENTS

| | | | |
|---|---|---|---|
| 6,873,715 B2 | 3/2005 | Kuo et al. | |
| 10,217,179 B2 | 2/2019 | Rodriguez et al. | |
| 10,803,301 B1 * | 10/2020 | Farivar | G06N 3/08 |
| 11,210,670 B2 * | 12/2021 | Loganathan | G06Q 20/322 |
| 12,039,504 B1 * | 7/2024 | Foster | G06Q 20/0425 |
| 2007/0064991 A1 * | 3/2007 | Douglas | G06Q 20/4016 382/137 |
| 2023/0281629 A1 * | 9/2023 | Shevyrev | G06Q 40/02 705/44 |

FOREIGN PATENT DOCUMENTS

WO    WO-2021120577 A1 *  6/2021  ............. G06F 18/21

* cited by examiner

*Primary Examiner* — Gabriel I Garcia
(74) *Attorney, Agent, or Firm* — Weiss & Arons LLP

(57) ABSTRACT

A method for detecting document forgery in real-time at a smart device is provided. The method may include capturing, via a smart device, an image of a document. The method may include extracting, via the smart device, data from the image. Based on the data, the method may include creating a dataset that may include a document type for the document and document details included in the document. The method may include confirming, on the smart device, that user account data retrieved from a remote server correlates to user account identifying data included in the document details. Following the confirming, the method may include determining a validity of the document using a fraud document detection engine. When one or more discrepancies are identified between the dataset and the ML data, the method may include transmitting an electronic fraud alert notification from the smart device to a network of smart devices.

20 Claims, 7 Drawing Sheets

REAL-TIME DOCUMENT FORGERY DETECTION

FIELD OF TECHNOLOGY

Aspects of the disclosure relate to edge computing detection of forgery in documents.

BACKGROUND OF THE DISCLOSURE

Today, many online websites use digital imaging software and specialized counterfeiting services to generate forged documents that are difficult to identify as fraud. Sometimes, a customer that is not eligible for a specific product and/or service may present an altered or fabricated document in an attempt to be eligible for the product/service. To the human eye, the document may pass inspection.

It would be desirable, therefore, to provide systems and methods to scan documents to detect fraud. It would further be desirable to provide hand-held computing devices that are configured to scan documents to detect fraud with at least a portion of the detection being executed on the device itself, thus reducing latency and increasing the speed of the output.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
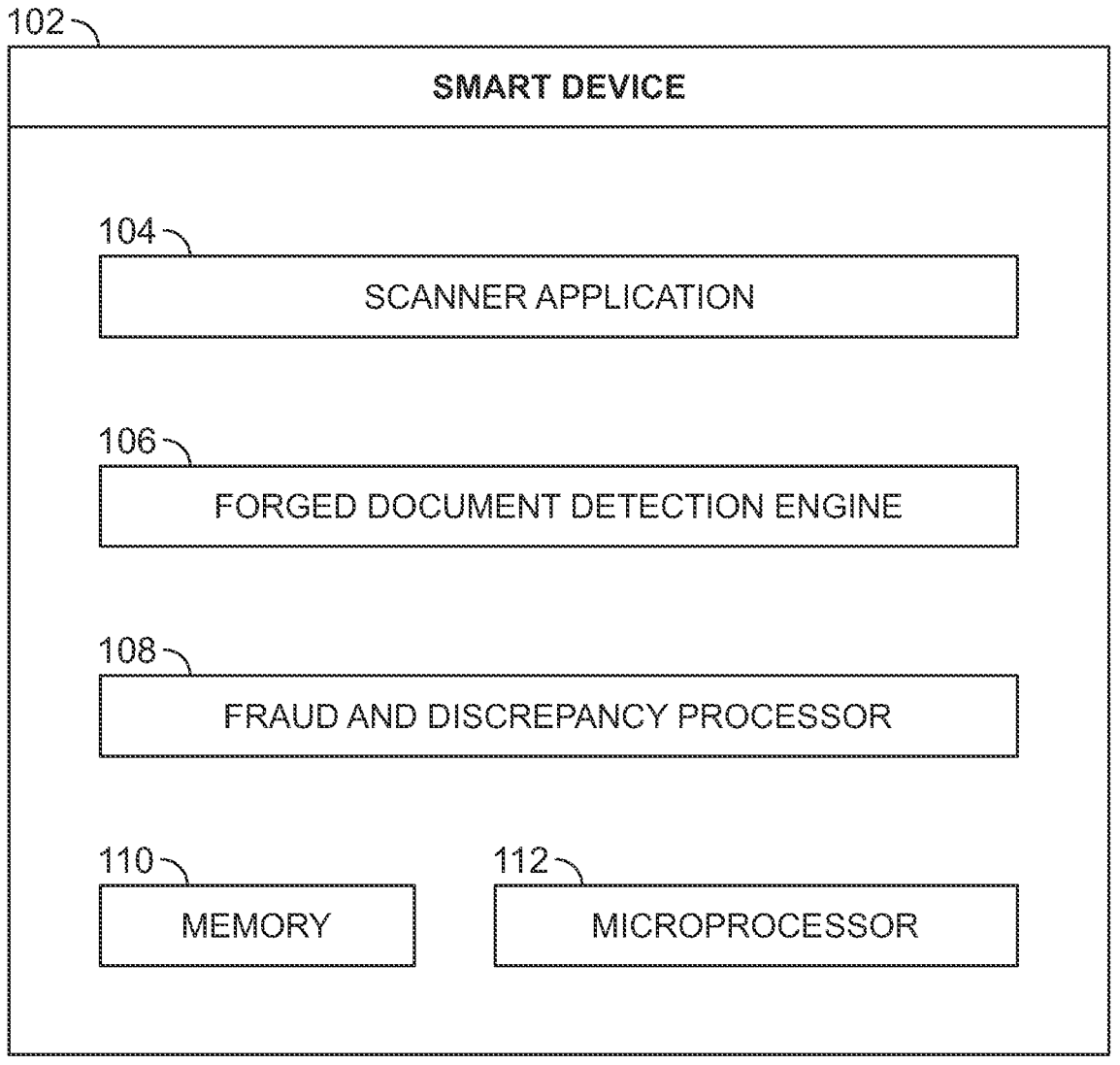
FIG. 1 shows an illustrative diagram in accordance with principles of the disclosure.

A method for detecting document forgery in real-time via a network of smart devices is provided. The network of smart devices may include a first smart device and a second smart device. The network of smart devices may include a third smart device, a fourth smart device and any other suitable number of smart devices.

Each smart device may be a mobile device. Each smart device may be a hand-held computing device. Each smart device may be one of a smartphone, iPhone, tablet, iPad, smartwatch, smartglasses, or any other suitable mobile device.

Each smart device within the network of smart devices may be enabled to scan a document received from a customer and analyze the document to detect whether any fraudulent activity and/or data is included in the document.

For example, when a customer approaches a teller at a financial institution, the customer may present the teller with one or more documents. The documents may be necessary to be present in order to perform a transaction. The document (s) may be a form of identification, i.e.—a driver's license, a passport, a birth certificate. The document may also include an application form including one or more legal forms to support the application. The legal forms may include a mortgage form, a tax form, or any other suitable form.

In accordance with principles of the disclosure, the teller may utilize a smart device to check that the document is a real document and does not include any form of forgery.

The smart device may be a secure smart device. It should be appreciated that the smart device may be utilized for the purposes of checking the documents for forgery and may not be utilized for any other outside or external purpose. The smart device may store the document(s) for a pre-determined duration of time to preferably maximize security of any private data included in the document(s).

The method may include, at a first smart device, capturing, via the first smart device, a first image of a document. The first image may include a copy of the document. The first image may also include background data captured by the first smart device. The background data may not be applicable to the document.

The method may include storing the first image at a data cache at the first smart device. The method may also include storing the first image at a data cache within each smart device included in the network of smart devices. The first smart device may transmit the first image to each of the smart devices for storing.

The first image may be stored temporarily. The first image may be stored permanently. The first image may be stored for a pre-determined time period. The pre-determined time period may be a number of minutes, hours, days, weeks or any other suitable pre-determined time period.

It should be appreciated that the first image and any other image may be stored temporarily in order to enhance the security of the documents being scanned. These documents may include personal and/or private data. The storing may enable the smart device to analyze and detect whether there is fraud included in the document.

As each customer approaches a teller with one or more documents, the images of the documents may be added to the stored images in the data cache. Each image may be tagged with a timestamp.

The method may include extracting data from the first image. The data may be extracted using optical character recognition ("OCR"). The data may also be extracted using image binarization and statistical analysis algorithms.

The method may further include, based on the extracted data, creating a dataset. The dataset may include a document type for the document. The document may be displayed, at least in part, on the first image.

The document type may be a legal document, i.e.—a birth certificate, driver's license, passport. The document type may be a financial form, a bank statement or any other suitable document. An exemplary financial form may include a tax form, mortgage loan form or any other suitable form.

The dataset may include document details included in the document. The document details may include user identification data, a business name, one or more dates and/or images that may be associated with the type of document or any other suitable details.

When the document type is a tax form, the document details may be a TIN/SSN, EIN/SSN, a business start date, tax form year or any other suitable details.

The method may further include identifying by the smart device, via a remote server, a user account associated with the document. The identifying may include transmitting to the remote server data extracted from the first image that may include user identification.

The method may further include retrieving, from the remote server, user account data. The user account data may be identified based on the user identification data transmitted to the remote server. The user account data may include profile data and account activity data associated with the user account.

In some embodiments, the user account data retrieved from the remote server may not correlate to the user account identifying data included in the document details. This may be an indication of suspicious activity attempting to be performed. In this example, the smart device may pause any further detection determination and transmit an electronic notification on a user interface ("UI") of the smart device of an indication of fraud.

The method may include confirming, on the first smart device, that the user account data retrieved from the remote server correlates to user account identifying data included in the document details.

Following the confirming, the method may include determining a first validity determination of the document.

The method may include feeding the dataset to a forged document detection engine running on the first smart device. The forged document detection engine may be a software application that may be enabled to, using the extracted data, compare the extracted data to machine learning ("ML") data stored in memory. The ML data may include historical documents identified to include fraud. The ML data may include external knowledge forgery datasets identified by third parties. The ML data may include document templates that may include appropriate layouts for the text and images of specific type documents. These document templates may assist in identifying based on positioning of text and images within the first image, whether the document may be fraud.

The method may include comparing, on the first smart device, the dataset to the ML data stored in the database at the smart device. The comparing may include comparing images extracted from the first image to a plurality of images stored in the database. The images may be a logo of an entity. The images may be one or more barcodes.

The comparing may include comparing text included in the document to text in the ML data. The comparing of text may also include comparing a position of the text on the document to the positioning of the text in a document template.

The method may include identifying one or more discrepancies in the dataset.

In response to the identifying, the method may include displaying an electronic fraud alert notification on the UI of the first smart device. The method may further include transmitting the electronic fraud alert notification from the first smart device to each of the smart devices within the network of smart devices. The method may also include transmitting the first image to each of the smart devices within the network of smart devices.

In some embodiments, the method may also include transmitting the electronic fraud alert notification to an additional computing device associated with a user of the first smart device. The user of the first smart device may be performing additional transactions at the additional computing device and the alert notification may be displayed on the UI of the computing device. The additional computing device may be the primary computer the user is using. The first smart device may be a secondary computing device specifically used for scanning documents to detect forgery.

The alert notification may be displayed on a UI of each of the smart devices. The first image may be stored at each of the smart devices.

The method may further include, at a second smart device, capturing, via the second smart device, a second image of the document. The second smart device may be from within the network of smart devices. In some embodiments, the capturing of the second image at the second smart device may occur within a pre-determined time range to the capturing of the first image at the first smart device. The pre-determined time range in some embodiments may be a range from or below five minutes to end of business on that same day. In some embodiments, the pre-determined time range may be a range between one day and seven days or any other suitable pre-determined time range.

For example, when the capturing of the second image at the second smart device occurs within the pre-determined time range to the capturing of the first image at the first smart device, this may indicate that the customer has attempted to approach a different teller at the same location or within the same vicinity to process the document.

The method may include, prior to executing a second validity determination, comparing the second image to images stored in the data cache. The comparing may include executing a determination to determine if the second image has a threshold level of similarity with an image stored in the data cache.

Following the comparing, the method may include determining, by the second smart device, that the second image has a greater than the threshold level of similarity to the first image.

When the second image has a greater than the threshold level of similarity to the first image, this may be an indication that the document included in the first image, is the same document that is included in the second image. In this embodiment, the customer associated with the document may have attempted to present the fraudulent document to two separate employees.

In response to the determining, the method may include suspending the validity determination of the second document and transmitting an instruction to the remote server to lock the user account.

It should be appreciated that the determining of the validity of the document via the first smart device improves a validity response time by executing the determination locally at the smart device and independent of communications between the smart device and the remote server. By running at the edge, this enables a seamless, real-time processing of the document and further reduces the time for processing the document and outputting the results.

In some embodiments, following the analysis, the method may include deleting the first image from storage.

In some embodiments, following the pre-determined time period for storing the first image, the method may include deleting the first image from the data cache at the first smart device. The method may further include transmitting an instruction to each of the smart devices within the network of smart devices for deleting the first image from the data cache.

The pre-determined time period for storing the first image may be between one hour and a 24-hour period. In some embodiments, the pre-determined time period for storing the first image may be a couple of days and/or months.

The method may further include, prior to deleting, transmitting the first image and the dataset to the remote server for training a machine learning fraud detection model. When the first image and/or the dataset include any personal or private data, the method may include masking the personal and/or private data prior to transmitting to the remote server.

In some embodiments, when the pre-determined time period occurs prior to the second smart device capturing the second image, the first image may be deleted from the data cache at the second smart device. In this embodiment, the second smart device may not identify an image with a threshold level of similarity. The method may include performing the second validity determination of the second image.

It should be appreciated that the second validity determination of the second image may be performed using the methods described herein for performing the first validity determination.

A method for detecting document forgery in real-time via a smart device is provided. The method may be performed by a microprocessor running on the smart device.

The method may include capturing, via a smart device, an image of a document. The method may include storing the image at the smart device. The storing may be for a pre-determined duration of time.

The method may further include extracting, via the smart device, data from the image. The data may include text, images and any other suitable data.

The method may include creating a dataset based on the extracted data. The dataset may include a document type for the document. The document may be displayed, at least in part, on the image. The dataset may include document details included in the document.

The method may include retrieving, from a remote server, user account data associated with the user account. The user account data may include profile data and account activity data. The user account data may be identified based on the document details.

The method may include confirming, on the smart device, that the user account data retrieved from the remote server correlates to user account identifying data included in the document details.

Following the confirming, the method may include determining a validity of the document. The determining of the validity of the document may include feeding the dataset to a forged document detection engine running on the smart device.

The determining may further include comparing, at the smart device, the dataset to ML data stored in a database at the smart device.

When one or more discrepancies are identified between the dataset and the ML data, the method may include transmitting an electronic fraud alert notification from the smart device to a network of smart devices. The network of smart devices may be within a pre-determined proximity to the smart device.

In some embodiments, the electronic fraud alert notification may be displayed on a screen of the smart device. The electronic fraud alert notification may be displayed on a screen of each smart device included in the network of smart devices.

When one or more discrepancies are not identified, the method may include validating the document at the smart device.

The method may further include, following a lapse of the pre-determined duration of time for storing the image, deleting the image from the smart device.

In some embodiments the method may include transmitting, via the smart device, the dataset and the image to an ML fraud detection model stored at the remote server, at pre-determined intervals. The transmitting for training and updating the ML fraud detection model stored and running at the remote server.

The ML fraud detection model running at the remote server may be continuously fed data for training and updating the model. The forged document detection engine may be updated periodically with training data from the ML fraud detection model.

When comparing the dataset to the ML data, the method may include executing a discrepancy and fraud processor for the comparing. The discrepancy and fraud processor may process the dataset using image binarization techniques and statistical analysis techniques.

The processing using statistical analysis may include analyzing the document details for identifying discrepancies. The analyzing may include checking for one or more missing values in a sequential data. The analyzing may include identifying suspicious timing of a data entry. The analyzing may include searching for duplicate transactions.

A system for detecting document forgery in real-time leveraging edge computing is provided. The system may include a first smart device in possession of a first user. The first smart device may be from a network of smart devices.

The system may include a second smart device. The second smart device may be in possession of a second user. The second smart device may be from within the network of smart devices. The second smart device may be within a pre-determined proximity to the first smart device.

The pre-determined proximity may be within a few feet. The pre-determined proximity may be within the same room. The pre-determined proximity may be at another brick and mortal institution that is located within a pre-defined number of miles to a first brick and mortal institution or any other suitable distance.

The system may include an ML forged document detection engine. The ML forged document detection engine may be stored at the first smart device and at the second smart device. The ML forged document detection engine may be executed at the first smart device and at the second smart device.

The system may include a remote server. The remote server may be in electronic communication with each of the first smart device and the second smart device.

It should be appreciated that the ML forged document detection engine may be executed at the first smart device and at the second smart device independent of any connectivity to the remote server.

When a document is positioned for scanning by the first smart device, the first smart device may be configured to capture a first image of the document.

The first smart device may further be configured to store the first image, for a pre-determined time period, at a data cache at the first smart device and at a data cache at the second smart device.

The first smart device may further be configured to extract, via the first smart device, data from the first image.

The first smart device may be configured to create, via the first smart device, a dataset based on the extracted data. The dataset may include a document type for the document, and document details included in the document.

The first smart device may be configured to retrieve, from the remote server, user account data. The user account data may include profile data and account activity data associated with the user account described herein.

The first smart device may be configured to confirm, on the first smart device, that the user account data retrieved from a remote server correlates to user account identifying data included in the document details.

The first smart device may be configured to determine a first validity determination of the document utilizing the forged document detection engine described herein.

When discrepancies are identified, the first smart device may be configured to transmit an electronic fraud alert notification and the first image from the first smart device to each smart device within the network of smart devices.

When a document is positioned for scanning by the second smart device, the second smart device may be configured to capture, via the second smart device, a second image of the document. Prior to determining a second validity of the document, the second smart device may be configured to compare the second image to images stored in the data cache. The comparing may include executing a determination to determine if the second image has a threshold level of similarity with an image stored in the data cache.

The system may include determining, by the second smart device, that the second image has the threshold level of similarity with the first image. In response to the determining, the second smart device may be configured to suspend the second validity determination of the document and transmit an instruction to the remote server to lock the user account.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative diagram of a smart device 102 in accordance with principles of the disclosure.

Smart device 102 may be a stand-alone computing device. Smart device 102 may be a mobile computing device, i.e.—a smartphone, iphone, tablet and/or laptop.

Figure 6:
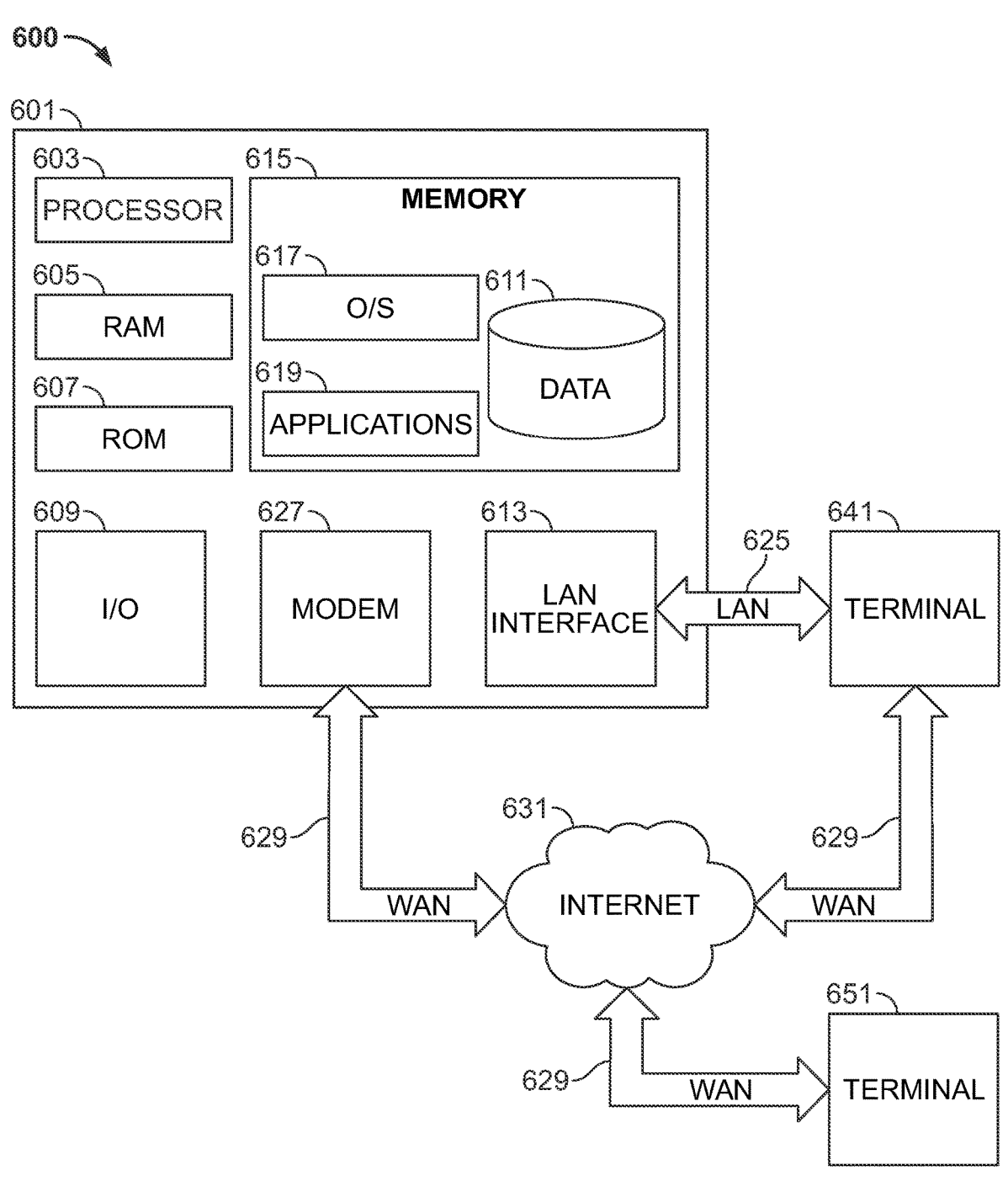
FIG. 6 shows an illustrative block diagram in accordance with principles of the disclosure.
Figure 7:
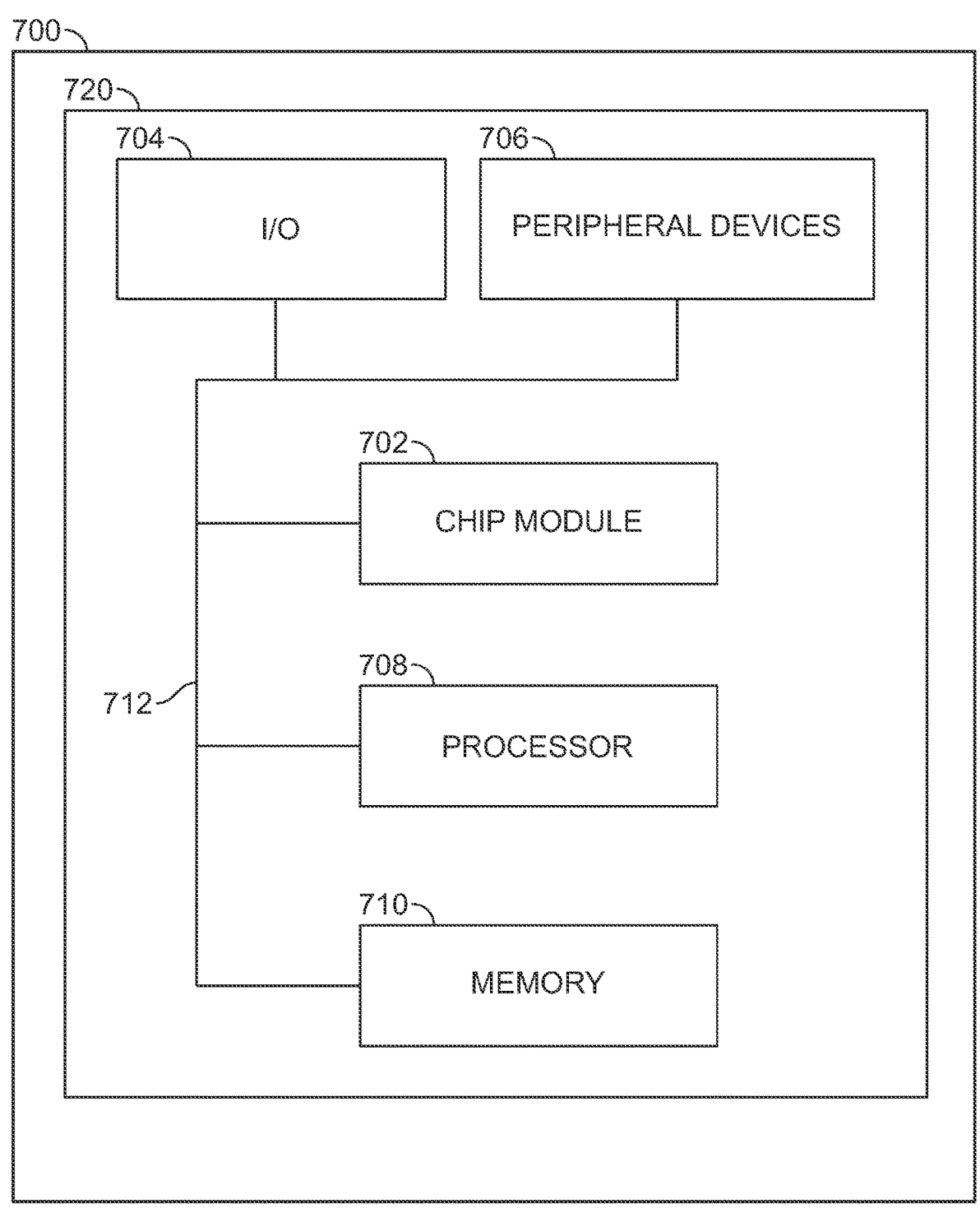
FIG. 7 shows an illustrative apparatus that may be configured in accordance with principles of the disclosure.

Smart device 102 may include computer architecture and programs described in FIGS. 6 and 7.

Smart device 102 may include a scanner application 104. Scanner application 104 may be configured for scanning one or more documents presented by a customer for performing a transaction. Scanner application 104 may scan the document(s). Smart device 102 may store the scanned documents as images in memory 110.

Forged document detection engine 106 may be stored and running at smart device 102. Forged document detection engine 106 may be executed by microprocessor 112 at smart device 102. Fraud and discrepancy processor 108 may also be stored at smart device 102. Microprocessor 112 may execute fraud and discrepancy processor 108.

Figure 2:
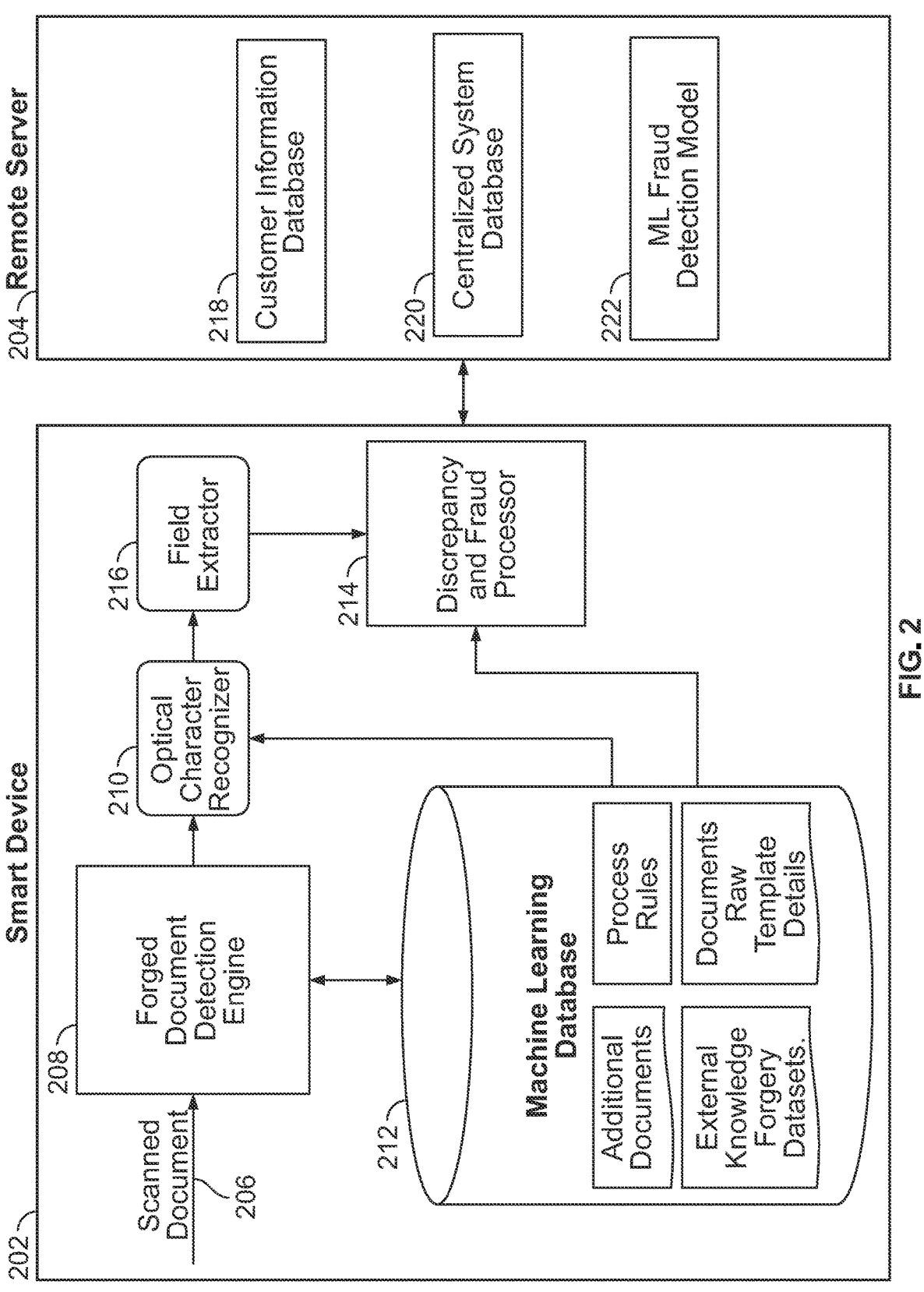
FIG. 2 shows an illustrative diagram in accordance with principles of the disclosure.

FIG. 2 shows an illustrative diagram of a system architecture for detecting document forgery.

Smart device 202 may be a computing device. Smart device 202 may be enabled to scan a document at the smart device. Smart device 202 may be configured to extract data from the document. Smart device 202, determine whether there may be any indications of fraud.

Smart device 202 may communicate with remote server 204. Smart device 202 may communicate with remote server 202 for retrieval of user account profile data and prior account activity associated with the user account profile. Smart device 202 may also communicate with remote server 204 to retrieve updated ML data from ML fraud detection model 222 running at remote server 204.

Smart device 202 may execute forged document detection engine 208 for detection of fraud. It should be appreciated that forged document detection engine 208 may operate independent of any connectivity to remote server 204.

In this exemplary diagram a document may be scanned by smart device 202. The document may be stored as an image 206 on smart device 202. Forged document detection engine 208 may be executed by a processor running on smart device 202. Forged document detection engine 208 may run an optical character recognizer algorithm (OCR") 210 for identifying the text and images that may be included in image 206.

Following the execution of OCR 210, forged document detection engine 208 may execute field extractor 216 for extracting pertinent data from the identified text and images that may be used to assist in determining the validity of the document embedded in image 206. The extracted data may be stored as a dataset on smart device 202 for analysis.

Images extracted may include barcodes, logos, symbols and any other suitable images. Text extracted may include any data included in the image. Text extracted from the image may include data that may be associated with the user. Text extracted from the image may include data that may be associated with an account of the user, legal information and any other suitable text.

Forged document detection engine 208 may analyze the dataset for indications of fraud. Forged document detection engine 208 may execute a discrepancy and fraud processor 214 for comparing the datasets to trained data stored in the ML database 212. Forged document detection engine 208 may utilize data stored at ML database 212 for comparing and identifying fraud.

ML database 212 may include trained ML algorithms for detecting forgery. The trained ML algorithms may be generated based on a plurality of data fed to the forged document detection engine 208. The data fed to forged document detection engine 208 may include process rules. Process rules may be an order in which data fed to forged document detection engine 208 may be reviewed and processed.

ML database 212 may store document raw template details. The document raw template details may include templates for each type of legal document and/or financial form that may have a probability of being scanned by smart device 202.

ML database 212 may store external knowledge forgery datasets. These datasets may be training datasets of examples of documents that are forged. ML database 212 may also store additional documents used to train the ML algorithm for forged document detection engine 208.

Remote server 204 may include a customer information database 218. Customer information database 218 may include a database of an account profile for each customer. Remote server 204 may include a centralized system database 202. Centralized system database 220 may include account profile for customers that may transition from one entity to another entity.

ML fraud detection model 222 may include an ML trained model for fraud recognition. Following each analysis of a scanned document, the datasets and decisioning may be transmitted to the ML fraud detection model 222 to train the ML trained model. Remote server 204 may, at pre-determined intervals, electronically communicate with smart device 202 to update the forged document detection engine 208. Simultaneously, smart device 202 may electronically communicate with remote server 204 to update ML fraud detection model 222 at the remote server 204.

Figure 3:
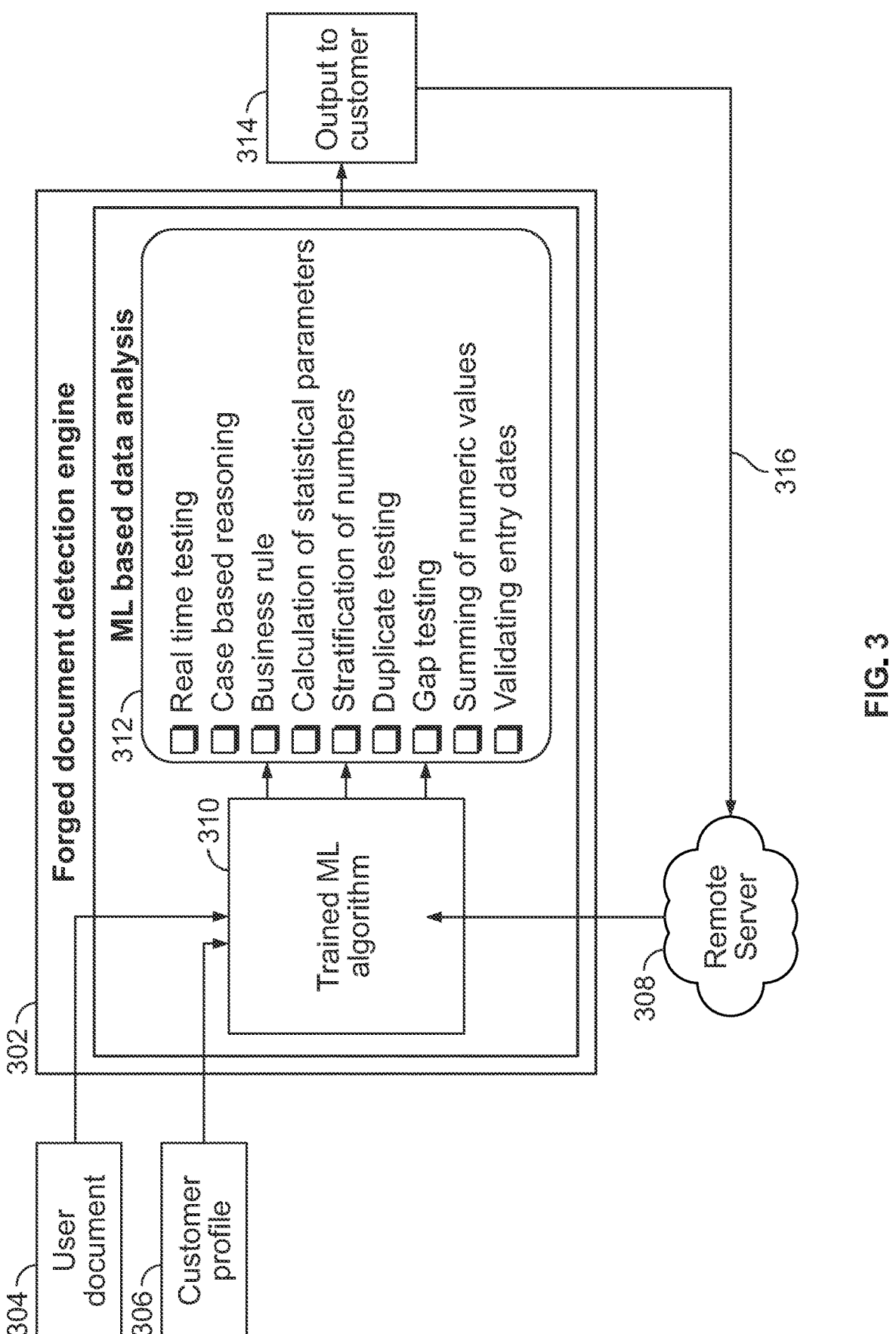
FIG. 3 shows an illustrative diagram in accordance with principles of the disclosure.

FIG. 3 shows an illustrative exemplary diagram of forged document detection engine 302. Forged document detection engine 302 may be running on a smart device. In this exemplary diagram, forged document detection engine may execute the trained ML algorithm 310 for determining validity of a document 304. Trained ML algorithm 310 may leverage ML based data analysis 312 for determining the validity.

In this exemplary diagram, user document 304 and customer profile 306 may be transmitted to forged document detection engine 302 for analysis. Trained ML algorithm 310 may determine a validity of the document using training data. Training data may be fed to forged document detection model stored at remote server 308. The training data may be continuously transmitted to forged document detection engine 302 for training the trained ML algorithm 310.

ML based data analysis 312 may be utilized in combination with trained ML algorithm 310 for identifying discrepancies. ML based data analysis 312 may execute one or more tests on user document 304 for verifying the data. In some embodiments, ML based data analysis 312 may assign a score for each test performed.

ML based data analysis 312 may test for calculation of statistical parameters in order to identify outliers that may be an indication of fraud. Real time data testing may be a test to identify known or unknown patterns within the document. Stratification of numbers may be an analysis performed to identify excessively high or low data entries.

Case based reasoning analysis may be performed to identify unexpected occurrences of digits in naturally occurring data sets. An analysis for duplicate testing may be performed to identify duplicate transactions, i.e.—payments, claims or expense report items.

Gap testing may be performed to identify possible missing values in sequential data. Summing of numerical values analysis may be performed to identify control totals that may have been falsified. Validating entry dates may be performed to identify suspicious and/or inappropriate times for postings or data entry.

Following the determining of the validity of user document 304, the results may be transmitted as output to the user of the smart device, as shown at 314. Additionally, the data retrieved from user document 304 and the results may be transmitted to remote server 308, as shown at 316, for training the forged document detection model stored at remote server 308.

Figure 4:
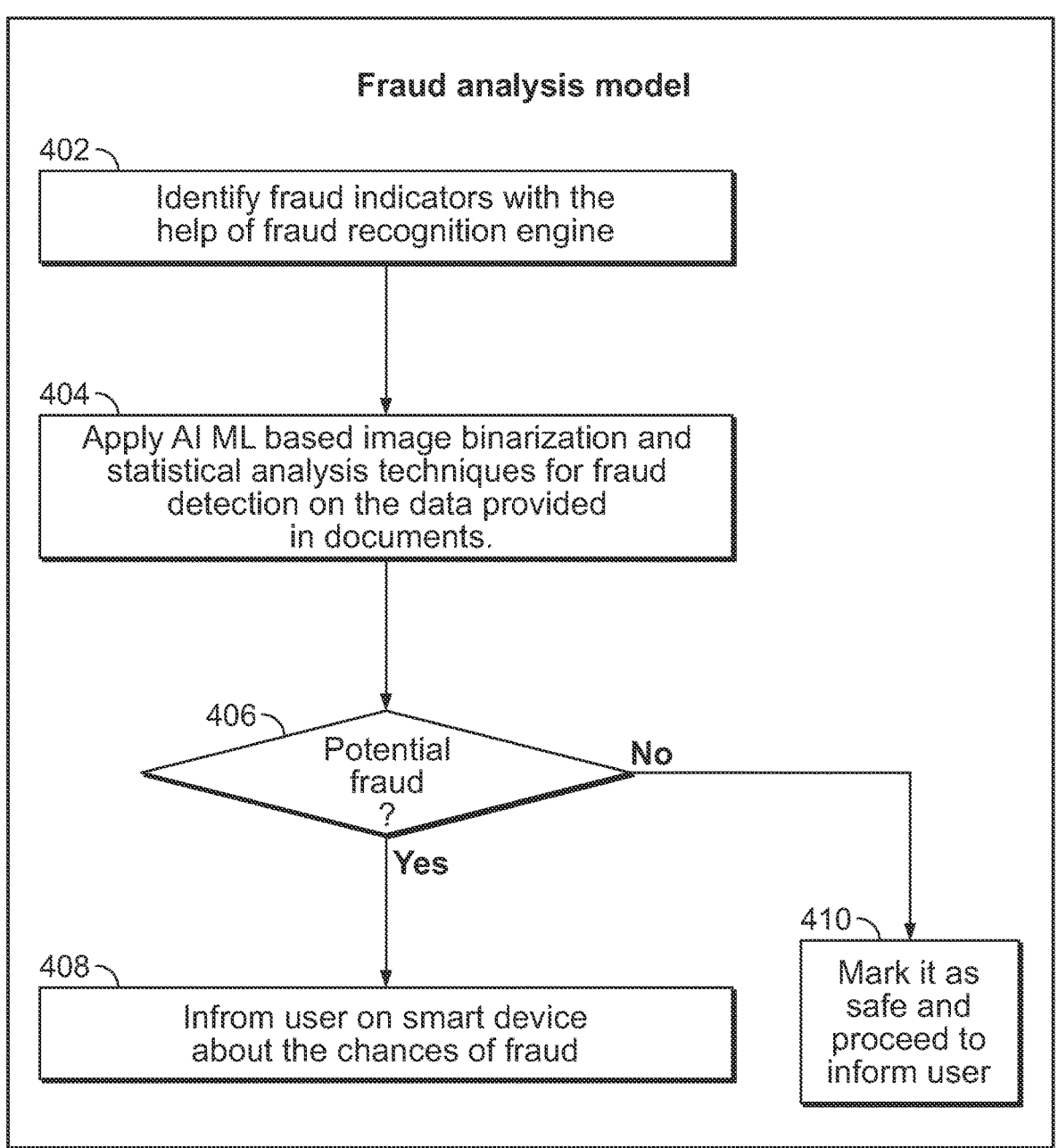
FIG. 4 shows an illustrative diagram in accordance with principles of the disclosure.

FIG. 4 shows an illustrative flow diagram of a model for fraud analysis.

At 402, using the fraud detection recognition engine running on the smart device, fraud indicators may be identified.

At 404, an artificial intelligence ("AI") and ML based image binarization and statistical analysis techniques for fraud detection may be executed on the extracted data from the image(s).

At 406, the fraud indicators may be examined to determine whether they are potential fraud or not. In the event that they are determined to be potential fraud, an electronic message notifying the user of potential fraud may be transmitted and displayed to the user of the smart device, as shown at 408.

When the fraud indicators are determined not to be potential fraud, an electronic message may be displayed to the user authenticating the document, as shown at 410.

Figure 5:
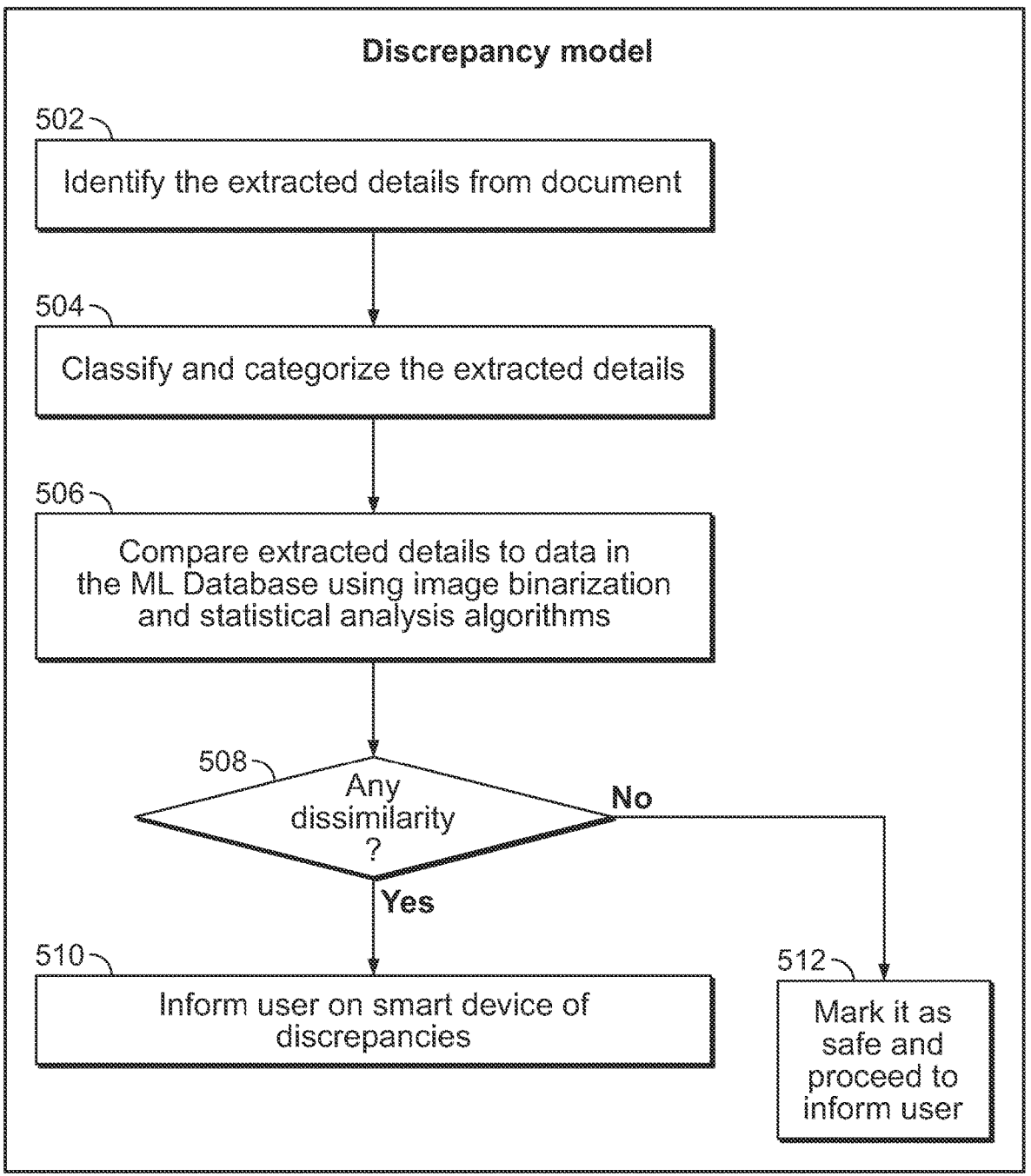
FIG. 5 shows an illustrative diagram in accordance with principles of the disclosure.

FIG. 5 shows an illustrative flow diagram of a model for determining discrepancies. The model for determining discrepancies may be executed via a discrepancy processor running on the smart device.

At 502, the discrepancy processor may identify the extracted details from the document. At 504, the discrepancy processor may classify and categorize the extracted details.

At 506, the discrepancy processor may compare the extracted details to data stored in the ML database. The comparing may include using image binarization and statistical analysis algorithms.

At 508, the discrepancy processor may determine whether any discrepancies are identified. When one or more discrepancies are identified, a communication may be transmitted to inform user of the smart device of the discrepancies, as shown at 510. When one or more discrepancies are not identified, the document may be marked as secure, and the transaction may be performed, as shown at 512.

FIG. 6 shows an illustrative block diagram of system 600 that includes computer 601. Computer 601 may alternatively be referred to herein as an "engine," "server" or a "computing device." The computing system may include one or more computer servers 601. Computer 601 may be any computing device described herein. Computer 601 may include each smart device within the network of smart devices described herein. Computer 601 may include the remote server. Elements of system 600, including computer 601, may be used to implement various aspects of the systems and methods disclosed herein.

Computer 601 may have a processor 603 for controlling the operation of the device and its associated components, and may include RAM 605, ROM 607, input/output circuit 609, and a non-transitory or non-volatile memory 615. Processor 603 may include microprocessor 112 and fraud and discrepancy processor 108 described in FIG. 1. Machine-readable memory may be configured to store information in machine-readable data structures. Other components commonly used for computers, such as EEPROM or Flash memory or any other suitable components, may also be part of the computer 601.

The memory 615 may be comprised of any suitable permanent storage technology—e.g., a hard drive. The memory 615 may store software including the operating system 617 and application(s) 619 along with any data 611 needed for the operation of computer 601. Memory 615 may also store videos, text, and/or audio assistance files. The data stored in Memory 615 may also be stored in cache memory, or any other suitable memory. Memory 615 may include ML database stored at the smart device.

Input/output ("I/O") module 609 may include connectivity to a microphone, keyboard, touch screen, mouse, and/or stylus through which input may be provided into computer 601. The input may include input relating to cursor movement. The input/output module may also include one or more speakers for providing audio output and a video display device for providing textual, audio, audiovisual, and/or graphical output. The input and output may be related to computer application functionality.

Computer 601 may be connected to other systems via a local area network (LAN) interface 613. Computer 601 may operate in a networked environment supporting connections to one or more remote computers, such as terminals 641 and 651. Terminals 641 and 651 may be personal computers or servers that include many or all of the elements described above relative to computer 601.

When used in a LAN networking environment, computer 601 is connected to LAN 625 through a LAN interface 613 or an adapter. When used in a WAN networking environment, computer 601 may include an environment 627 or other means for establishing communications over WAN 629, such as Internet 631.

In some embodiments, computer 601 may be connected to one or more other systems via a short-range communication network (not shown). In these embodiments, computer 601 may communicate with one or more other terminals 641 and 651, using a PAN such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 619, which may be used by computer 601, may include computer executable instructions for invoking functionality related to communication, such as e-mail, Short Message Service (SMS), and voice input and speech recognition applications. Application program(s) 619 (which may be alternatively referred to herein as "plugins," "applications," or "apps") may include computer executable instructions for invoking functionality related to performing various tasks. Application programs 619 may utilize one or more algorithms that process received executable instructions, perform power management routines or other suitable tasks.

Application program(s) 619 may include computer executable instructions (alternatively referred to as "programs"). The computer executable instructions may be embodied in hardware or firmware (not shown). The computer 601 may execute the instructions embodied by the application program(s) 619 to perform various functions.

Application program(s) 619 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 619 may include any one or more of the applications, instructions and algorithms associated with and/or embedded within the smart device(s) and the remote server. Applications 619 may include the scanner application 104, forged document detection engine 106, optical character recognizer 210, field extractor 216 and any other application described herein.

The invention may be described in the context of computer-executable instructions, such as applications 619, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 601 and/or terminals 641 and 651 may also include various other components, such as a battery, speaker, and/or antennas (not shown). Components of computer system 601 may be linked by a system bus, wirelessly or by other suitable interconnections. Components of computer system 601 may be present on one or more circuit boards. In some embodiments, the components may be integrated into a single chip. The chip may be silicon-based.

Terminal 651 and/or terminal 641 may be portable devices such as a laptop, cell phone, Blackberry™, tablet, smartphone, or any other computing system for receiving, storing, transmitting and/or displaying relevant information. Terminal 651 and/or terminal 641 may be one or more user devices. Terminals 651 and 641 may be identical to computer 601 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

FIG. 7 shows illustrative apparatus 700 that may be configured in accordance with the principles of the disclosure. Apparatus 700 may be a computing device. Apparatus 700 may include chip module 702, which may include one or more integrated circuits, and which may include logic configured to perform any other suitable logical operations.

Apparatus 700 may include one or more of the following components: I/O circuitry 704, which may include a transmitter device and a receiver device and may interface with fiber optic cable, coaxial cable, telephone lines, wireless devices, PHY layer hardware, a keypad/display control device or any other suitable media or devices; peripheral devices 706, which may include counter timers, real-time timers, power-on reset generators or any other suitable peripheral devices; logical processing device 708, which may compute data structural information and structural parameters of the data, and machine-readable memory 710.

Machine-readable memory 710 may be configured to store in machine-readable data structures: machine executable instructions, (which may be alternatively referred to herein as "computer instructions" or "computer code"), applications such as applications 619, signals, and/or any other suitable information or data structures.

Components 702, 704, 706, 708 and 710 may be coupled together by a system bus or other interconnections 712 and may be present on one or more circuit boards such as circuit board 720. In some embodiments, the components may be integrated into a single chip. The chip may be silicon-based.

Thus, systems and methods for detecting document forgery in real-time is provided. Persons skilled in the art will appreciate that the present invention can be practiced by other than the described embodiments, which are presented for purposes of illustration rather than of limitation.

What is claimed is:

1. A method for detecting document forgery in real-time via a network of smart devices, the method comprising:

at a first smart device, the first smart device from the network of smart devices:

capturing, via the first smart device, a first image of a document;

storing the first image, for a pre-determined time period, at a data cache at the first smart device and at a data cache within each smart device included in the network of smart devices;

extracting, via the first smart device, data from the first image;

creating, at the first smart device, a dataset based on the extracted data, the dataset comprising:

a document type for the document, the document being displayed, at least in part, on the first image; and document details included in the document;

retrieving, from a remote server, user account data, the user account data comprising profile data and account activity data associated with a user account, the user account data identified based on the document details;

confirming, on the first smart device, that the user account data retrieved from the remote server correlates to user account identifying data included in the document details; and determining a first validity of the document by:

feeding the dataset to a forged document detection engine running on the first smart device;

comparing, on the first smart device, the dataset to machine learning ("ML") data stored in a database at the first smart device;

identifying one or more discrepancies between the dataset and the ML data; and in response to the identifying, transmitting an electronic fraud alert notification and the first image from the first smart device to the network of smart devices, the network of smart devices being within a pre-determined proximity to the first smart device; and at a second smart device, the second smart device from the network of smart devices:

capturing, via the second smart device, a second image of the document;

prior to executing a second validity determination, comparing the second image to images stored in the data cache, the comparing including executing a determination to determine if the second image has a threshold level of similarity with an image stored in the data cache;

determining, by the second smart device, that the second image comprises greater than the threshold level of similarity to the first image;

in response to the determining, suspending the second validity determination of the second image; and transmitting an instruction to the remote server to lock the user account;

wherein:

the determining of a validity of the document via the first smart device improves a validity response time by executing the determination locally at the first smart device and independent of communications between the smart device and the remote server.

2. The method of claim 1 further comprising, following the pre-determined time period, deleting the first image from the data cache at the first smart device and at each of the smart devices within the network of smart devices.

3. The method of claim 2 further comprising, prior to deleting, transmitting the dataset to the remote server for training a machine learning fraud detection model, the dataset excluding any private data included in the dataset.

4. The method of claim 1 wherein the capturing of the second image at the second smart device occurs within a pre-determined time range to the capturing of the first image at the first smart device.

5. The method of claim 1 wherein each of the smart devices is a mobile device.

6. The method of claim 1 further comprising transmitting the electronic fraud alert notification to an additional computing device associated with a user of the first smart device.

7. A method for detecting document forgery in real-time via a smart device, the method performed by a microprocessor running on the smart device, the method comprising:

capturing, via a smart device, an image of a document;

storing the image at the smart device for a pre-determined duration of time;

extracting, via the smart device, data from the image;

creating a dataset based on the extracted data, the dataset comprising:

a document type for the document, the document being displayed, at least in part, on the image; and document details included in the document;

retrieving, from a remote server, user account data associated with the user account, the user account data comprising profile data and account activity data, the user account data identified based on the document details;

confirming, on the smart device, that the user account data retrieved from the remote server correlates to user account identifying data included in the document details; and following the confirming, determining a validity of the document by:

feeding the dataset to a forged document detection engine running on the smart device;

comparing, on the smart device, the dataset to machine learning ("ML") data stored in a database at the smart device;

when one or more discrepancies are identified between the dataset and the ML data, transmitting an electronic fraud alert notification from the smart device to a network of smart devices, the network of smart devices within a pre-determined proximity to the smart device; and when one or more discrepancies are not identified, validating the document, at the smart device;

wherein:

the determining of the validity of the document via the smart device improves a validity response time by executing the determination locally at the smart device and independent of communications between the smart device and the remote server.

8. The method of claim 7 wherein the document is a legal identification document.

9. The method of claim 7 wherein the document is a financial document.

10. The method of claim 7 further comprising, following a lapse of the pre-determined duration of time, deleting the image from the smart device.

11. The method of claim 7 wherein the smart device is configured to transmit the dataset and the image to a ML fraud detection model stored at the remote server, at pre-determined intervals, the transmitting for training and updating the ML fraud detection model.

12. The method of claim 7 wherein the electronic fraud alert notification is displayed on a screen of the smart device.

13. The method of claim 7 wherein the electronic fraud alert notification is displayed on a screen of each smart device within the network of smart devices.

14. The method of claim 7 wherein the comparing of the dataset to the ML data comprises executing a discrepancy and fraud processor for the comparing, the discrepancy and fraud processor processing the dataset using image binarization and statistical analysis.

15. The method of claim 14 wherein the processing using statistical analysis comprises analyzing the document details for identifying discrepancies comprising:

one or more missing values in a sequential data;

suspicious timing of a data entry; and duplicate transactions.

16. A system for detecting document forgery in real-time leveraging edge computing, the system comprising:

a first smart device associated with a first user, the first smart device from a network of smart devices;

a second smart device associated with a second user, the second smart device from the network of smart devices, the second smart device being within a pre-determined proximity to the first smart device;

a machine learning ("ML") forged document detection engine running at the first smart device and at the second smart device; and a remote server, the remote server in electronic communication with each of the first smart device and the second smart device;

wherein:

when a document is positioned for scanning by the first smart device, the first smart device is configured to:

capture a first image of the document;

store the first image, for a pre-determined time period, at a data cache at the first smart device and at a data cache at the second smart device;

extract, via the first smart device, data from the first image;

create, via the first smart device, a dataset based on the extracted data, the dataset comprising:

a document type for the document, the document being displayed, at least in part, on the first image; and document details included in the document;

retrieve, from a remote server, user account data, the user account data comprising profile data and account activity data associated with the user account;

confirm, on the first smart device, that the user account data retrieved from the remote server correlates to user account identifying data included in the document details;

determine a first validity of the document by:

feeding the dataset to the forged document detection engine running on the first smart device;

comparing, on the first smart device, the dataset to ML data stored in a database at the smart device;

identifying one or more discrepancies in between the dataset and the ML data; and in response to the identifying, transmitting an electronic fraud alert notification and the first image from the first smart device to the network of smart devices, the network of smart devices within a pre-determined proximity to the first smart device; and the second smart device is configured to, when a document is positioned for scanning by the second smart device:

capture, via the second smart device, a second image of the document;

prior to determining a second validity of the document, compare the second image to images stored in the data cache, the comparing including executing a determination to determine if the second image has a threshold level of similarity with an image stored in the data cache;

determine, by the second smart device, that the second image has the threshold level of similarity with the first image;

in response to the determining, suspend the second validity determination of the document; and transmit an instruction to the remote server to lock the user account;

wherein:

the determining of the validity of the document via the first smart device improves a validity response time by executing the determination locally at the first smart device and not requiring communications between the first smart device and the remote server.

17. The system of claim 16 wherein, following the pre-determined time period:

the first smart device is configured to delete the first image from the data cache at the first smart device; and the second smart device is configured to delete the second image from the data cache at the second smart device.

18. The system of claim 16 further comprising, prior to deleting, the first smart device is configured to transmit the dataset to the remote server for training a machine learning fraud detection model, the dataset excluding any private data included in the dataset.

19. The system of claim 16 wherein the first smart device is further configured to transmit the first image to each of a remaining smart devices within the network of smart devices for storing in a data cache at each of the remaining smart devices.

20. The system of claim 16 wherein each smart device included in the network of smart devices are mobile devices.

\* \* \* \* \*